(12) United States Patent  
Shiraishi

(10) Patent No.: US 10,152,657 B2  
(45) Date of Patent: Dec. 11, 2018

(54) IMAGE PROCESSING APPARATUS AND IMAGE PROCESSING METHOD OF COLOR IMAGE

(71) Applicant: Naoto Shiraishi, Kanagawa (JP)

(72) Inventor: Naoto Shiraishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/249,964

(22) Filed: Aug. 29, 2016

(65) Prior Publication Data

US 2017/0076184 A1    Mar. 16, 2017

(30) Foreign Application Priority Data

Sep. 11, 2015  (JP) ................. 2015-180209

(51) Int. Cl.
  *G06K 15/02*  (2006.01)
(52) U.S. Cl.
  CPC ....... *G06K 15/1802* (2013.01); *G06K 15/023* (2013.01); *G06K 15/1807* (2013.01); *G06K 15/1813* (2013.01); *G06K 15/1822* (2013.01); *G06K 2215/0068* (2013.01)
(58) Field of Classification Search
  None
  See application file for complete search history.

(56) References Cited

U.S. PATENT DOCUMENTS

| 2004/0150656 | A1 | 8/2004 | Shiraishi | |
|---|---|---|---|---|
| 2009/0128857 | A1 | 5/2009 | Shiraishi | |
| 2010/0238467 | A1 | 9/2010 | Shiraishi | |
| 2013/0155466 | A1 | 6/2013 | Shiraishi | |
| 2014/0226186 | A1 | 8/2014 | Shiraishi | |
| 2014/0233067 | A1 | 8/2014 | Shiraishi | |
| 2014/0362395 | A1 | 12/2014 | Shiraishi | |
| 2014/0375882 | A1* | 12/2014 | Gaiazov | H04N 5/272 348/453 |
| 2015/0235113 | A1 | 8/2015 | Shiraishi | |

FOREIGN PATENT DOCUMENTS

| JP | 07-028986 | 1/1995 |
|---|---|---|
| JP | 2010-220075 | 9/2010 |
| JP | 2014-155164 | 8/2014 |

* cited by examiner

*Primary Examiner* — Lennin Rodriguezgonzalez  
(74) *Attorney, Agent, or Firm* — Harness, Dickey & Pierce, P.L.C.

(57) ABSTRACT

An image processing device performs: breaking down a drawing command into horizontal line parameters each indicating a drawing parameter on a line-by-line basis; and reading, from a translucent image storage unit configured to store a translucent image including a translucency value indicating a transmission rate of a color value corresponding to pixel for each of a plurality of pixels, the translucency values of pixels corresponding to the horizontal line parameter, and writing color values designated by the horizontal line parameter directly into a color image storage unit configured to store a color image including a color value for each of a plurality of pixels as the color values of the respective pixels corresponding to the horizontal line parameter without reading the color values of the pixels corresponding to the horizontal line parameter from the color image storage unit, when all of the read translucency values indicate transparent.

9 Claims, 15 Drawing Sheets

FIG.8 (A)
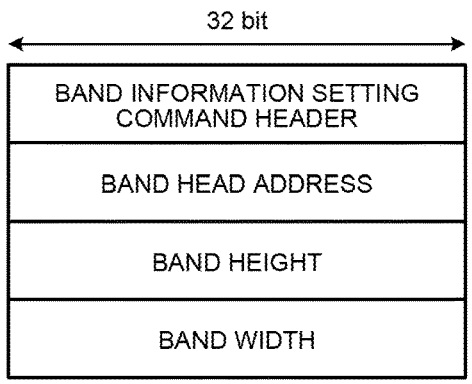
(B)
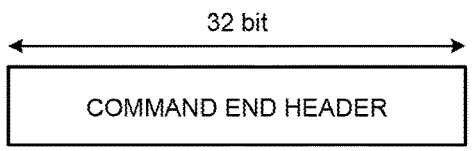
(C)
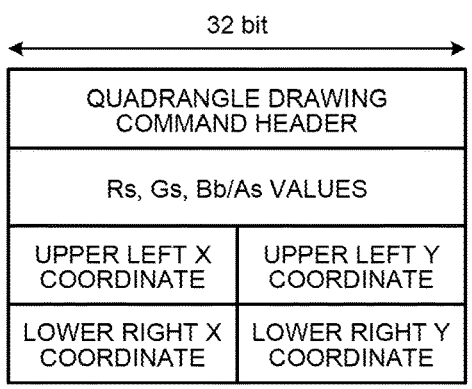
(D)
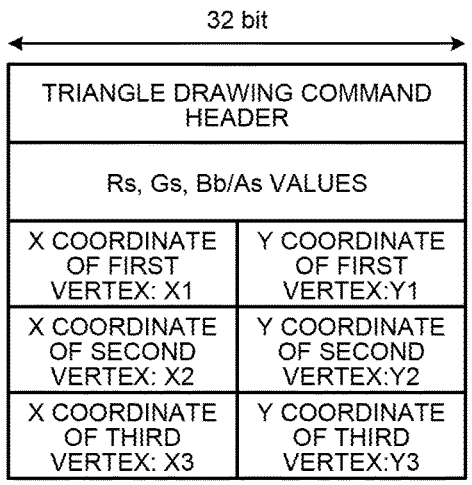

IMAGE PROCESSING APPARATUS AND IMAGE PROCESSING METHOD OF COLOR IMAGE

CROSS-REFERENCE TO RELATED APPLICATIONS

The present application claims priority under 35 U.S.C. § 119 to Japanese Patent Application No. 2015-180209, filed Sep. 11, 2015. The contents of which are incorporated herein by reference in their entirety.

BACKGROUND OF THE INVENTION

1. Field of the Invention

The present invention relates to an image processing apparatus and an image processing method.

2. Description of the Related Art

When page description language (PDL) data described in a page description language is printed, an example of conventional color printers analyzes the PDL, draws a multi-valued band image on a memory, performs color conversion processing and gradation processing on the drawn band image, and prints the image after the gradation processing. Translucency drawing processing, which is not included in the conventional PDLs, is newly added to a portable document format (PDF) and an extensible markup language (XPS), which are one of the PDLs. The translucency drawing processing, in which translucent images are overlapped, is performed in accordance with set processing parameters (translucency values). Specifically, the processing parameters are generally set for respective drawing objects in such a manner that each of the images to be overlapped with each other has a translucency value equal to or smaller than one and the total of the translucency values of the overlapped image is one.

For example, Japanese Unexamined Patent Application Publication No. H7-28986 discloses the following technique. When a pixel value after synthesis of a front image and a background image is calculated, a pixel value of the background image is set to the pixel value after the synthesis in the case where the pixel value of the front image indicates transparent (translucency value=zero) or translucent (translucency value=one) for the purpose of reducing a data transfer amount and a load in computing.

The technique disclosed in Japanese Unexamined Patent Application Publication No. H7-28986, however, has a problem in that it is difficult to achieve high-speed drawing processing because the processing is performed pixel by pixel.

SUMMARY OF THE INVENTION

According to an aspect of the present invention, there is provided an image processing apparatus, including: a color image storage unit configured to store a color image including a color value for each of a plurality of pixels; a translucent image storage unit configured to store, a translucent image including a translucency value indicating a transmission rate of the color value corresponding to the pixel for each of a plurality of pixels; a breakdown unit configured to break down a drawing command obtained by analyzing data described in a page description language into horizontal line parameters each indicating a drawing parameter on a line-by-line basis; and a drawing processing unit configured to read, from the translucent image storage unit, the translucency values of a plurality of pixels corresponding to the horizontal line parameter, and write color values designated by the horizontal line parameter directly into the color image storage unit as the color values of the respective pixels corresponding to the horizontal line parameter without reading the color values of the pixels corresponding to the horizontal line parameter from the color image storage unit, when all of the read translucency values indicate transparent.

According to another aspect of the present invention, there is provided an image processing method, including: breaking down a drawing command obtained by analyzing data described in a page description language into horizontal line parameters each indicating a drawing parameter on a line-by-line basis; and reading, from a translucent image storage unit configured to store a translucent image including a translucency value indicating a transmission rate of a color value corresponding to pixel for each of a plurality of pixels, the translucency values of pixels corresponding to the horizontal line parameter, and writing color values designated by the horizontal line parameter directly into a color image storage unit configured to store a color image including a color value for each of a plurality of pixels as the color values of the respective pixels corresponding to the horizontal line parameter without reading the color values of the pixels corresponding to the horizontal line parameter from the color image storage unit, when all of the read translucency values indicate transparent.

According to still another aspect of the present invention, there is provided an image processing apparatus, including: color image storage means for storing a color image including a color value for each of a plurality of pixels; translucent image storage means for storing a translucent image including a translucency value indicating a transmission rate of the color value corresponding to the pixel for each of a plurality of pixels; breakdown means for breaking down a drawing command obtained by analyzing data described in a page description language into horizontal line parameters each indicating a drawing parameter on a line-by-line basis; and drawing processing means for reading, from the translucent image storage unit, the translucency values of a plurality of pixels corresponding to the horizontal line parameter, and for writing color values designated by the horizontal line parameter directly into the color image storage unit as the color values of the respective pixels corresponding to the horizontal line parameter without reading the color values of the pixels corresponding to the horizontal line parameter from the color image storage unit, when all of the read translucency values indicate transparent.

BRIEF DESCRIPTION OF THE DRAWINGS

FIG. 8 includes schematic diagrams illustrating exemplary formats of commands;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENT

Figure 1:
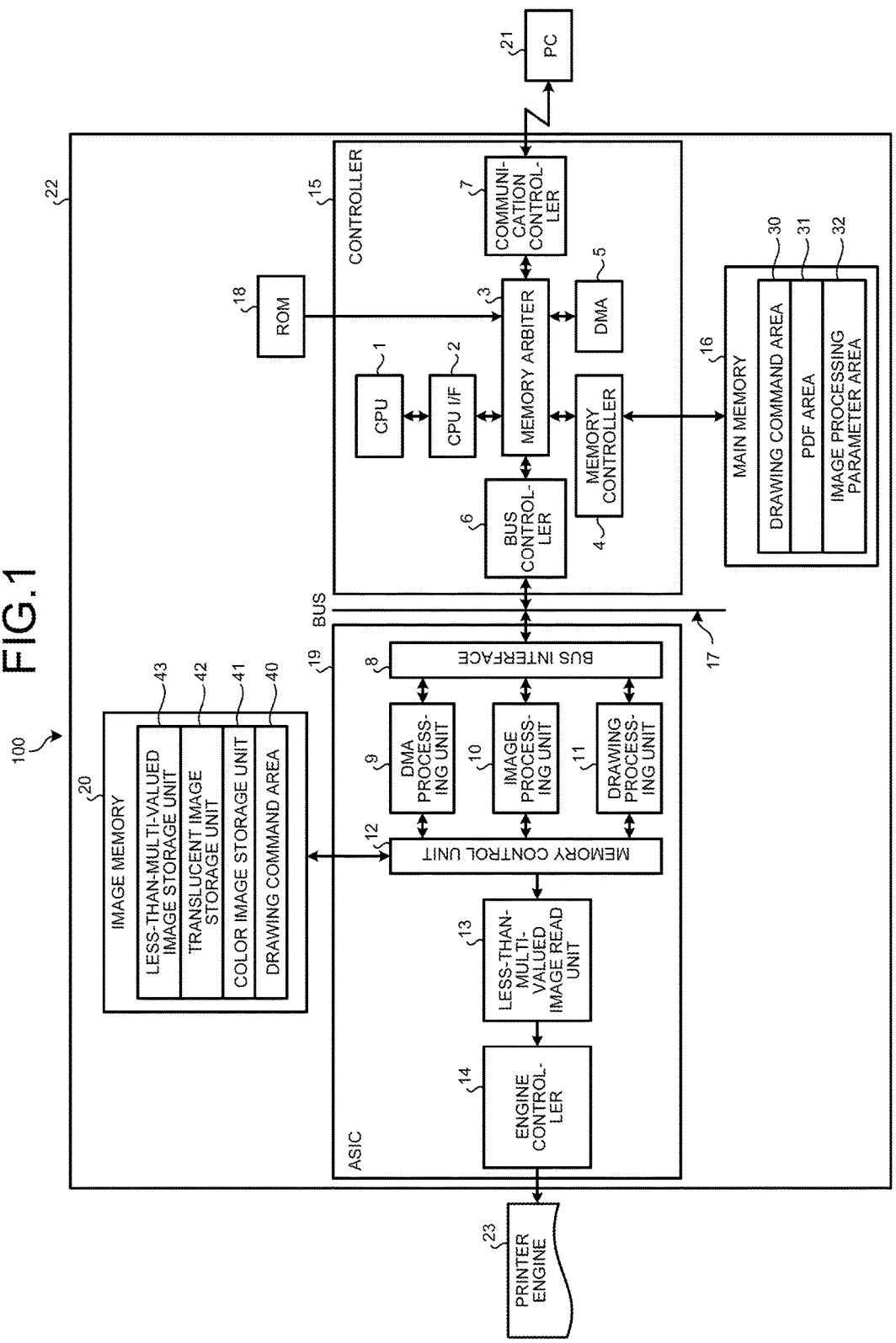
FIG. 1 is a schematic diagram illustrating an exemplary structure of an image forming apparatus.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

The present invention has an object to provide an image processing apparatus and an image processing method that can achieve high-speed drawing processing.

The following describes an embodiment of an image processing apparatus and an image processing method according to the invention in detail with reference to the accompanying drawings.

FIG. 1 is a schematic diagram illustrating an exemplary structure of an image forming apparatus 100 in the embodiment. As illustrated in FIG. 1, the image forming apparatus 100 includes a controller board 22 and a printer engine 23. The controller board 22 includes a read only memory (ROM) 18, a main memory 16, an image memory 20, a controller 15, and an application specific integrated circuit (ASIC) 19, which is hardware that achieves part of processing conventionally performed by a central processing unit (CPU). The controller board 22 is a printer controller board, for example. The controller board 22 is formed on a single substrate. The controller board 22 is an example of the "image processing apparatus".

The controller 15 and the ASIC 19 are coupled via a bus 17. A personal computer (PC) 21 produces data (hereinafter described as "PDL data" in some cases) described in a page description language (PDL) in accordance with the user's operation. For example, the PC 21 produces the PDL data such as data described in a portable document format (PDF) or an extensible markup language (XPS), and transmits the produced PDL data to the image forming apparatus 100. The following description is made on the basis of an example where the PC 21 produces the PDL data in accordance with the user's operation, and transmits the produced PDL data to the image forming apparatus 100.

The controller 15 includes a CPU 1, a CPU interface 2, a memory arbiter 3, a memory controller 4, a direct memory access controller (DMA) 5, a bus controller 6, and a communication controller 7. The ROM 18 and the main memory 16 are connected to the controller 15. The ROM 18 stores therein various programs used for controlling the controller board 22 and font information about characters, for example. The main memory 16 includes a plurality of predetermined areas such as a drawing command area 30 in which a drawing command is stored, a PDF area 31 in which the PDF data is stored, and an image processing parameter area 32 in which an image processing parameter is stored. The main memory 16 stores therein a program executed by the CPU 1, for example.

The CPU 1 controls the whole operation of the controller board 22 in accordance with the programs stored in the ROM 18, for example. The CPU 1 analyzes the PDF data transmitted from the PC 21 to produce the drawing commands. The CPU 1 is coupled to various memories and controllers via the CPU interface 2 and the memory arbiter 3. The memory arbiter 3 arbitrates between the main memory 16 and the various controllers. The memory controller 4 controls access (reading and writing data) to the main memory 16 and is coupled to the memory and the various controllers via the memory arbiter 3.

The DMA 5 performs direct memory access between the memory controller 4 and an engine controller 14 in the ASIC 19 coupled to the memory controller 4 via the bus 17. The bus controller 6 arbitrates between the bus 17 and each of peripheral controllers connected to the bus 17. The communication controller 7 controls communication between the controller 15 and an external apparatus such as the PC 21. In the example illustrated in FIG. 1, the communication controller 7 is connected to a network and can receive various types of data and commands via the network. The communication controller 7 is coupled to the various controllers via the memory arbiter 3.

The image memory 20 includes a drawing command area 40, a color image storage unit (color image storage area) 41, a translucent image storage unit (translucent image storage area) 42, and a less-than-multi-valued image storage unit (less-than-multi-valued image storage area) 43. The drawing command area 40 stores therein the drawing commands obtained by analyzing the PDF data.

Figure 2:
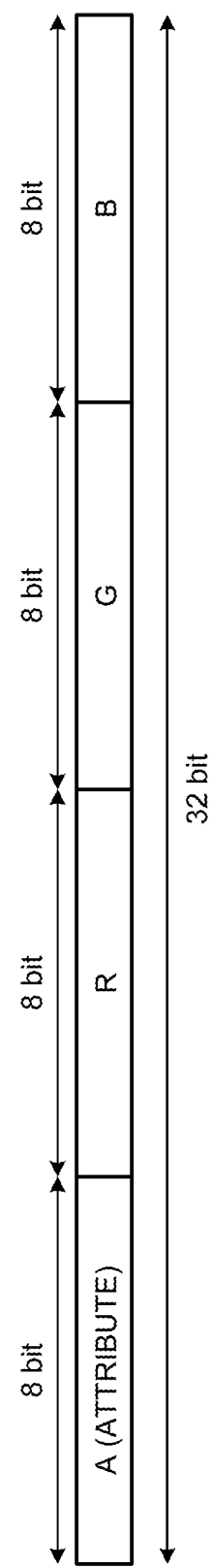
FIG. 2 is a schematic illustrating an example of data of one pixel in a color image stored in a color image storage unit.

The color image storage unit 41, which is an example of the "color image storage unit", stores therein a color image including a color value for each of a plurality of pixels. In this example, the color image storage unit 41 stores therein a multi-valued color image that represents a multi-valued color image. More specifically, the color image storage unit 41 stores therein A (attribute), and color values of respective color components R, G, and B, which are drawn on the basis of the analysis result of the PDF data. The color image storage unit 41 has a point-sequential memory format (pixel image memory format) in which data is arranged pixel by pixel. The color image stored in the color image storage unit 41 can therefore be accessed pixel by pixel. FIG. 2 is a schematic diagram illustrating an example of data of one pixel of the color image stored in the color image storage unit 41 in the embodiment. As illustrated in FIG. 2, the data of one pixel of the color image stored in the color image storage unit 41 is composed of A (attribute) and the respective color components R, G, and B. Each of the attribute and the pixels of the respective color components have 8 bits. The data of one pixel of the color image stored in the color image storage unit 41 has, thus, 32 bits, in which each of the attribute and the pixels of the respective color components has a bit depth of 8 bits. The value of A corresponds to a pixel attribute plane that is produced to hold an attribute value (attribute value of pixel) representing, as an attribute of pixel, a value for associating a drawing object.

Figure 3:
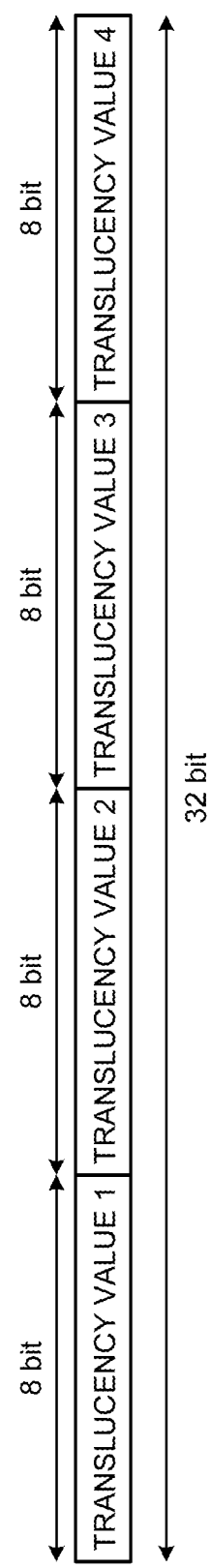
FIG. 3 is a schematic illustrating an example of data of one line in a translucent image stored in a translucent image storage unit.

Referring back to FIG. 1, the translucent image storage unit 42, which is an example of the "translucent image storage unit", stores therein a translucent image that includes a translucency value indicating a transmission rate of the color values corresponding to the pixel for each of a plurality of pixels. In this example, the translucent image storage unit 42 stores therein plane data (translucent image) that is drawn on the basis of the PDL analysis result of the PDF data, for example, and holds (for each pixel) the translucency value used for translucency drawing processing. The translucent image storage unit 42 has a plane-sequential memory format (plane image memory format) in which data is arranged line by line of the plane representing a set of pixels arranged in a matrix. The translucent image stored in the translucent image storage unit 42 can therefore be accessed line by line. FIG. 3 is a schematic diagram illustrating an example of data of one line of the translucent image stored in the translucent image storage unit 42 in the embodiment. In the example illustrated in FIG. 3, the line is composed of four pixels. The number of pixels included in the line is not limited to this example. As illustrated in FIG. 3, the data of the line of the plane is composed of the translucency values (#1 to #4) of the four pixels. The translucency value of each pixel is information of 8 bits and corresponds to the respective color components RGB of the pixel. The data of one line of the translucent image stored in the translucent image storage unit 42 has, thus, 32 bits, in which each of the four bits has a bit depth of 8 bits.

Figure 4:
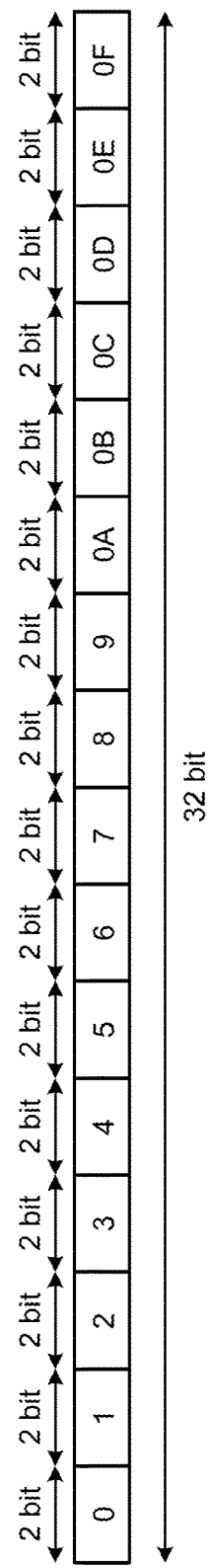
FIG. 4 is a schematic diagram illustrating an example format of a less-than-multi-valued image storage unit.

Referring back to FIG. 1, the less-than-multi-valued image storage unit 43 stores therein a less-than-multi-valued image. The less-than-multi-valued image in the embodiment is an image of fewer bits such as 1 bit or 2 bits, which is obtained by color-converting an RGB multi-valued image into a CMYK multi-valued image and then by gradation-processing the CMYK multi-valued image. Each of the color components R, G, and B has 8 bits and, thus, an RGB color has 24 bits in total. Each of the color components C, M, Y, and K has 8 bits and thus, a CMYK color has 32 bits in total. The less-than-multi-valued image is often a plane image because a printer prints an image on a recording medium such as paper for each of the colors of CMYK. FIG. 4 is a schematic diagram illustrating an exemplary format of the less-than-multi-valued image storage unit 43 in the embodiment. As illustrated in FIG. 4, 2 bits are allocated for each pixel in the plane for each of the colors of CMYK in the format of the less-than-multi-valued image storage unit 43. The less-than-multi-valued image is, thus, data (image data) of 32 bits in which each pixel of the plane has a bit depth of 2 bits.

Referring back to FIG. 1, the ASIC 19 includes a bus interface 8, a DMA processing unit 9, an image processing unit 10, a drawing processing unit 11, a memory control unit 12, a less-than-multi-valued image read unit 13, and the engine controller 14. The ASIC 19 reads the drawing command or the like stored in the main memory 16 through the bus 17, transfers the read drawing command to the image memory 20, reads the drawing command from the image memory 20, analyzes the read drawing command, and performs drawing processing. The ASIC 19 controls the printer engine 23 so as to cause the printer engine 23 to print the drawn image.

The bus interface 8 functions as an interface with the bus 17. The DMA processing unit 9 reads the drawing command from the drawing command area 30 in the main memory 16 and transfers the read drawing command to the drawing command area 40 in the image memory 20. The drawing processing unit 11 reads the drawing command from the drawing command area 40 in the image memory 20 and performs the drawing processing. The image processing unit 10 reads the color image from the color image storage unit 41 in the image memory 20, performs the image processing (to convert the color image into a less-than-multi-valued image), and transfers the resulting less-than-multi-valued image to the less-than-multi-valued image storage unit 43. The less-than-multi-valued image read unit 13 reads the less-than-multi-valued image from the less-than-multi-valued image storage unit 43 in the image memory 20 and transfers the read less-than-multi-valued image to the engine controller 14. The engine controller 14 controls the printer engine 23 so as to cause the printer engine 23 to perform printing on the basis of the less-than-multi-valued image. The memory control unit 12 controls access to the image memory 20 in response to a memory access request from the DMA processing unit 9, the image processing unit 10, the drawing processing unit 11, and the less-than-multi-valued image read unit 13.

Figure 5:
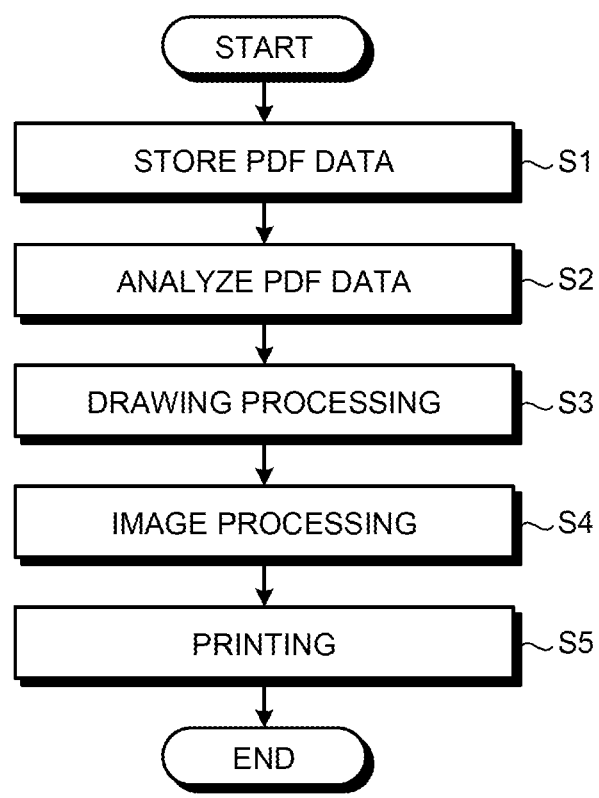
FIG. 5 is a flowchart illustrating an exemplary processing procedure in printing according to an embodiment.

FIG. 5 is a flowchart illustrating an exemplary processing procedure in printing according to the embodiment. The PC 21 produces the PDF data in accordance with the user's operation and transmits the produced PDF data to the image forming apparatus 100. The communication controller 7 receives the PDF data from the PC 21 and stores the PDF data in the PDF area 31 in the main memory 16 via the memory arbiter 3 (step S1).

The CPU 1 reads the PDF data from the PDF area 31 in the main memory 16 and analyzes the PDF data (step S2). The CPU 1 stores the drawing commands obtained as a result of the analysis in the drawing command area 30 in the main memory 16. The CPU 1 starts the DMA processing unit 9. The started DMA processing unit 9 reads the drawing commands from the drawing command area 30 in the main memory 16 and transfers the read drawing commands to the drawing command area 40 in the image memory 20.

The drawing processing unit 11 reads the drawing command from the drawing command area 40 in the image memory 20 and performs the drawing processing (step S3). The drawing processing unit 11 stores the color image obtained as a result of the drawing processing in the color image storage unit 41 and the translucent image obtained as a result of the drawing processing in the translucent image storage unit 42. The drawing processing is described in detail later.

The image processing unit 10 reads the color image from the color image storage unit 41 in the image memory 20 and performs the image processing on the read color image (step S4). In this example, the image processing unit 10 stores the less-than-multi-valued image obtained as a result of color conversion processing and gradation processing in the less-than-multi-valued image storage unit 43.

The less-than-multi-valued image read unit 13 reads the less-than-multi-valued image from the less-than-multi-valued image storage unit 43 in synchronization with the printer engine 23 and transfers the read less-than-multi-valued image to the engine controller 14. The engine controller 14 controls the printer engine 23 so as to cause the printer engine 23 to perform printing on the basis of the transferred less-than-multi-valued image (step S5).

Figure 6:
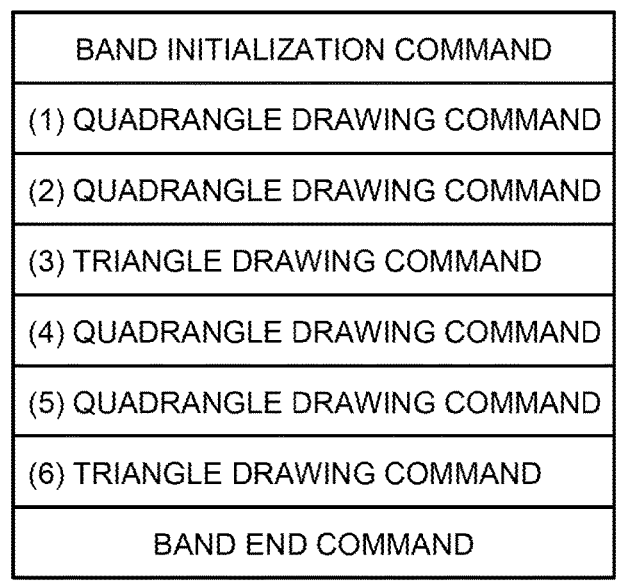
FIG. 6 is a schematic diagram illustrating exemplary drawing commands.
Figure 7:
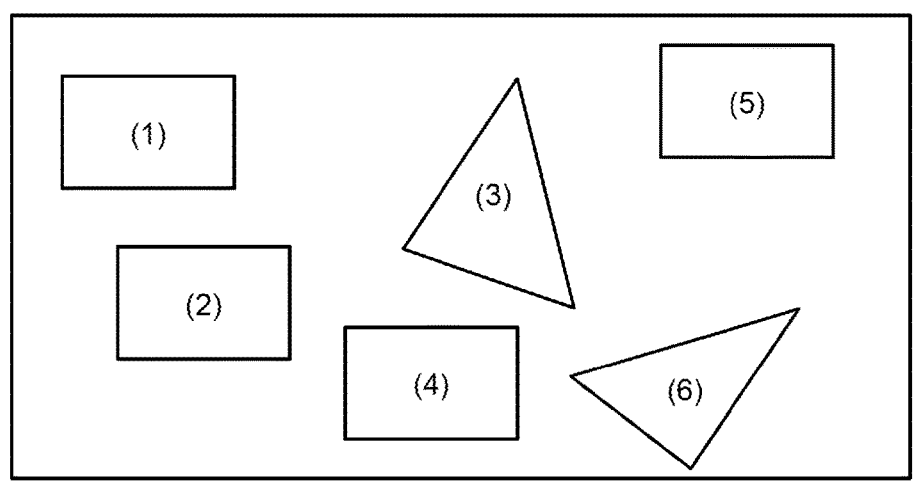
FIG. 7 is a schematic diagram illustrating exemplary band images.

FIG. 6 is a schematic diagram illustrating exemplary drawing commands. FIG. 7 is a schematic diagram illustrating exemplary band images drawn by the drawing commands illustrated in FIG. 6. The numbers attached to the respective band images illustrated in FIG. 7 correspond to the numbers of the respective drawing commands illustrated in FIG. 6.

FIG. 8 includes schematic diagrams illustrating exemplary formats of respective commands. (A) in FIG. 8 illustrates an example of a parameter setting command that sets a size of the band to be drawn. The size of the band to be drawn is defined by information (a band head address, a band height, and a band width) following a band information setting command header.

Figure 9:
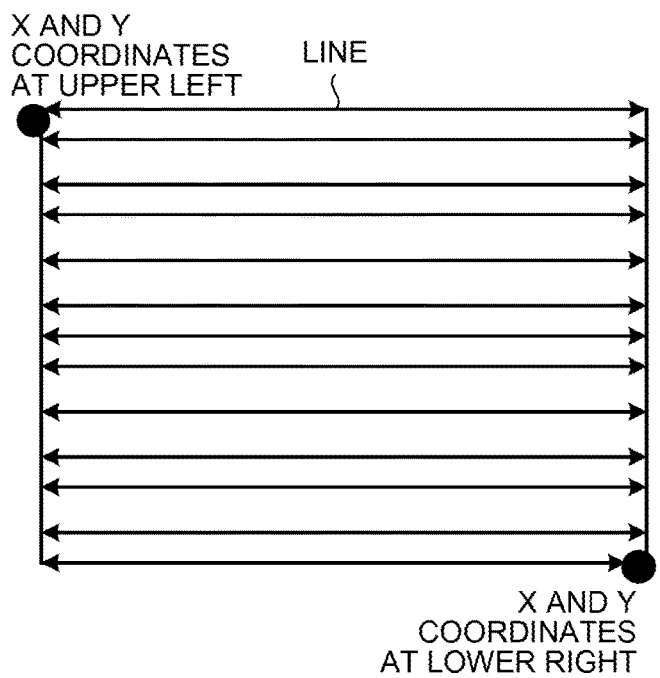
FIG. 9 is a schematic diagram illustrating an example of the quadrangle drawn by the drawing command.

(B) in FIG. 8 illustrates an example of an end command that indicates the end of the drawing command. (C) in FIG. 8 illustrates an example of a quadrangle drawing command that draws a quadrangle. The quadrangle drawing command instructs color values (hereinafter described as source color values Rs, Gs, and Bs in some cases) of the respective colors of RGB of a quadrangle to be drawn, a translucency value (hereinafter described as a source translucency value As in some cases), an X coordinate and a Y coordinate at the upper left corner and an X coordinate and a Y coordinate at the lower right corner of the quadrangle following a quadrangle drawing command header. FIG. 9 is a schematic diagram illustrating an example of the quadrangle drawn by the quadrangle drawing command. As described later, a drawing parameter (horizontal line parameter) is produced line by line. The line extends in the horizontal direction (lateral direction). The quadrangle drawing command is broken down into the drawing parameters for the respective lines.

Figure 10:
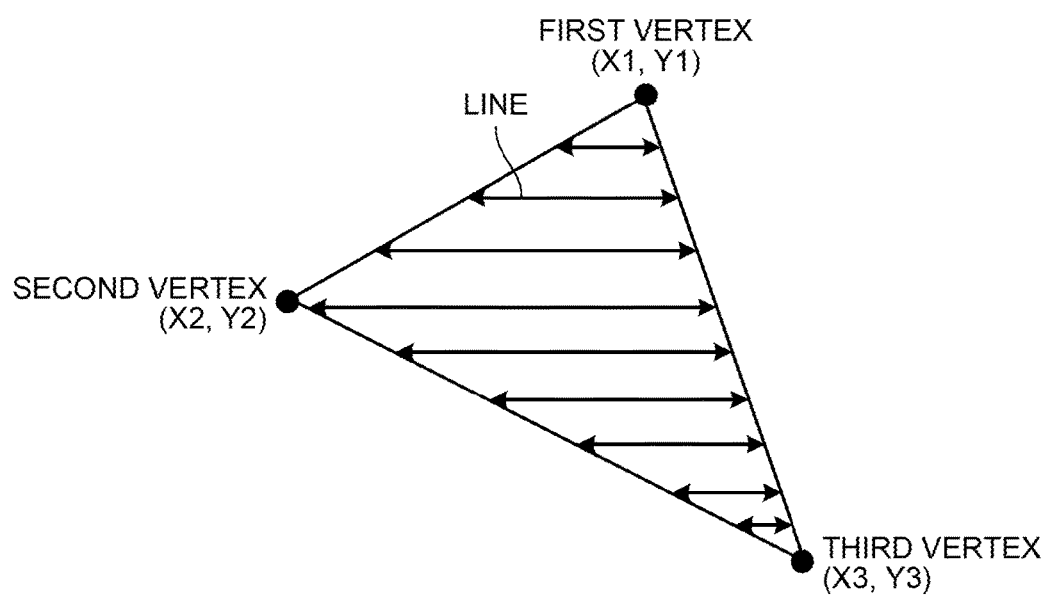
FIG. 10 is a schematic diagram illustrating an example of the triangle drawn by the drawing command.

(D) in FIG. 8 illustrates an example of a triangle drawing command that draws a triangle. The triangle drawing command instructs the source color values (Rs, Gs, and Bs) of the respective colors of RGB and the source translucency value (As) of the quadrangle to be drawn, and respective X coordinates (X1, X2, and X3) and respective Y coordinates (Y1, Y2, and Y3) of the three vertexes following a triangle drawing command header. FIG. 10 is a schematic diagram illustrating an example of the triangle drawn by the triangle drawing command. As described later, the drawing parameter (horizontal line parameter) is produced line by line. The line extends in the horizontal direction (lateral direction). The triangle drawing command is broken down into the drawing parameters for the respective lines.

Figure 11:
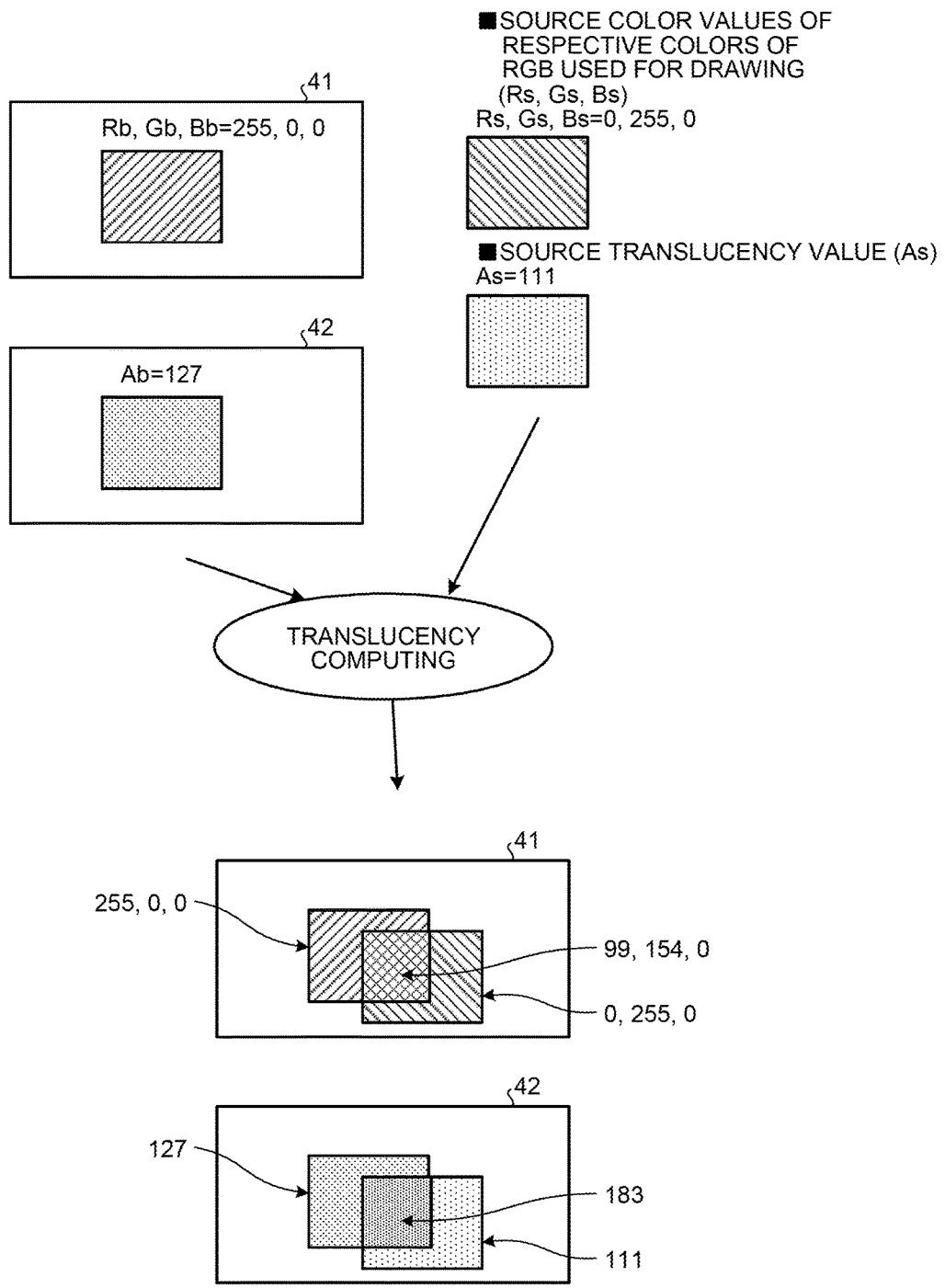
FIG. 11 is a schematic diagram illustrating an outline of drawing processing performed by a drawing processing unit.

The following describes a structure of the drawing processing unit 11 that performs the drawing processing. FIG. 11 is a schematic diagram illustrating an outline of the drawing processing performed by the drawing processing unit 11. The drawing processing unit 11 performs translucency computing based on the color values (Rb, Gb, and Bb) of the respective colors of RGB before the translucency computing read from the color image storage unit 41, the translucency value (Ab) before the translucency computing read from the translucent image storage unit 42, the source color values (Rs, Gs, and Bs) of the respective colors of RGB, and the source translucency value (As). The drawing processing unit 11 writes the color values (Rd, Gd, and Bd) of the respective colors of RGB after the translucency computing into the color image storage unit 41, and writes the translucency value (Ad) after the translucency computing into the translucent image storage unit 42. The details will be described later.

Figure 12:
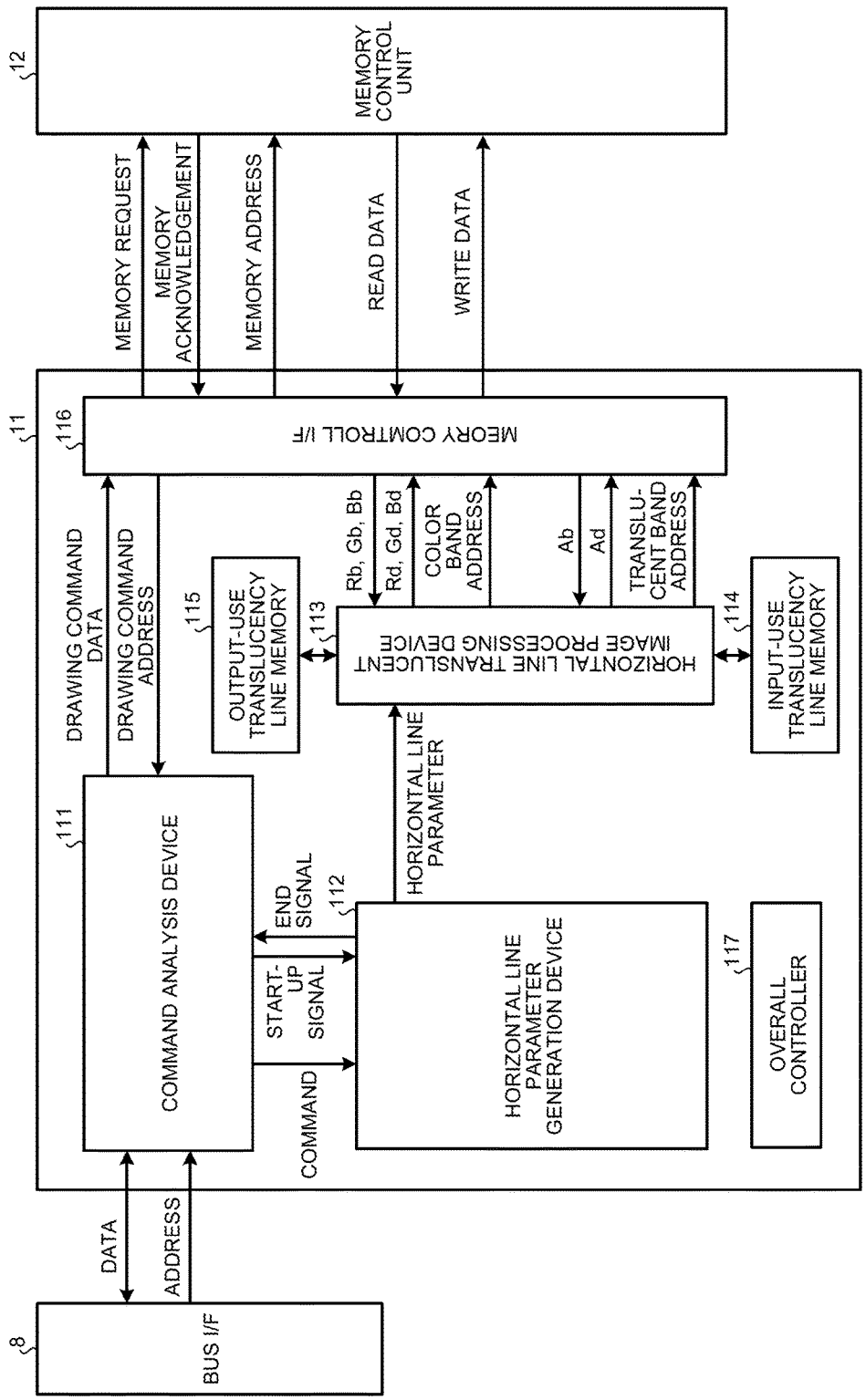
FIG. 12 is a schematic diagram illustrating an exemplary specific structure of the drawing processing unit.

FIG. 12 is a schematic diagram illustrating a specific example of the drawing processing unit 11. As illustrated in FIG. 12, the drawing processing unit 11 includes a command analysis device 111, a horizontal line parameter generation device 112, a horizontal line translucent image processing device 113, an input-use translucency line memory 114, an output-use translucency line memory 115, and a memory control interface (I/F) 116.

The command analysis device 111 reads the drawing command from the drawing command area 40 in the image memory 20, transfers the read drawing command to the horizontal line parameter generation device 112, and thereafter transfers a start-up signal to the horizontal line parameter generation device 112. When receiving an end signal from the horizontal line parameter generation device 112 after the transfer of the start-up signal, the command analysis device 111 reads the next drawing command. When reading the end command, the command analysis device 111 ends the processing. In this example, the command analysis device 111 can transmit a drawing command address to the memory control I/F 116 and receive the drawing command as the response to the transmission of the drawing command address.

The horizontal line parameter generation device 112 is an example of the "breakdown unit". The horizontal line parameter generation device 112 breaks down the drawing command obtained by a result of the analysis of data (in this example, the PDF data) described in a page description language into the horizontal line parameters that indicate the drawing parameters for the respective lines. Each of a plurality of horizontal line parameters corresponds to one of a plurality of lines (refer to FIGS. 9 and 10) dividing the drawing object (e.g., a quadrangle or a triangle) defined by the drawing command. Each horizontal line parameter includes at least a coordinate IY in the height direction, a start point coordinate Xs and an end point coordinate Xe in the horizontal direction of the drawing object on a line-by-line basis, and the color values (source color values Rs, Gs, and Bs of the respective colors of RGB) and the translucency value (the source translucency value As) used for drawing the drawing object on a line-by-line basis. The horizontal line parameter generation device 112 transfers the produced horizontal line parameter to the horizontal line translucent image processing device 113 at every production of the horizontal line parameter. When the production of all of the horizontal line parameters is completed, the horizontal line parameter generation device 112 transfers the end signal to the command analysis device 111.

The horizontal line translucent image processing device 113 performs the translucency computing based on the horizontal line parameter received from horizontal line parameter generation device 112, the color values (Rb, Gb, and Bb) of the respective colors of RGB read from the color image storage unit 41, and the translucency value (Ab) read from the translucent image storage unit 42. The horizontal line translucent image processing device 113 re-writes the color values (Rd, Gd, and Bd) after the translucency computing into the color image storage unit 41, and re-writes the translucency value (Ad) after the translucency computing into the translucent image storage unit 42. In this example, the horizontal line translucent image processing device 113 can transmit an address (color band address) of the color image before the translucency computing to the memory control I/F 116 in accordance with the horizontal line parameter and receive the color values (Rb, Gb, and Bb) of the respective colors of RGB read from the color image storage unit 41 in the image memory 20 as the response to the transmission of the color band address. The horizontal line translucent image processing device 113 can transmit an address (translucent band address) of the translucent image before the translucency computing to the memory control I/F 116 in accordance with the horizontal line parameter and receive the translucency value (Ab) read from the translucent image storage unit 42 in the image memory 20 as the response to the transmission of the translucent band address. The horizontal line translucent image processing device 113 can perform writing on the color image storage unit 41 and the translucent image storage unit 42 in the image memory 20 by transferring the color values (Rd, Gd, and Bd) after the translucency computing and the translucency value (Ad) after the translucency computing to the memory control I/F 116.

The horizontal line translucent image processing device 113 is an example of the "drawing processing unit". The horizontal line translucent image processing device 113 reads the translucency values of a plurality of pixels corresponding to the horizontal line parameter from the translucent image storage unit 42. When all of the read translucency values indicate transparent, the horizontal line translucent image processing device 113 directly writes the color values designated by the horizontal line parameter into the color image storage unit 41 as the color values of each of the multiple pixels corresponding to the horizontal line parameter without reading the color values of the multiple pixels corresponding to the horizontal line parameter from the color image storage unit 41. In this example, the multiple pixels corresponding to the horizontal line parameter are all of the pixels included in one line corresponding to the horizontal line parameter. The pixels included in one line are the pixels corresponding to a range from the coordinates (Xs,IY) to the coordinates (Xe,IY), which are designated by the horizontal line parameter. The multiple pixels corresponding to the horizontal line parameter are not limited to those in this example. For example, the pixels included in one line corresponding to the horizontal line parameter are divided into a plurality of groups each having two or more pixels, and two or more pixels included in each group may be the "multiple pixels corresponding to the horizontal line parameter".

The horizontal line translucent image processing device 113 reads the color values of the multiple pixels corresponding to the horizontal line parameter from the color image storage unit 41 when the translucency value that indicates translucency (in this example, the translucency value indicating "zero") is included in the translucency values read from the translucent image storage unit 42. The horizontal line translucent image processing device 113 obtains, for each of the multiple pixels corresponding to the horizontal line parameter, the translucency value after the translucency computing by performing the translucency computing based on the translucency value read from the translucent image storage unit 42 and the translucency value designated by the horizontal line parameter. The horizontal line translucent image processing device 113 obtains, for each of the multiple pixels corresponding to the horizontal line parameter, the color values after the translucency computing by performing the translucency computing based on the read translucency value, the translucency value after the translucency computing, the translucency value designated by the horizontal line parameter, and the color values read from the color image storage unit 41. The horizontal line translucent image processing device 113, then, directly writes the color values after the translucency computing into the color image storage unit 41 as the color values of the pixel. The drawing processing performed by the horizontal line translucent image processing device 113 will be described in detail later.

The input-use translucency line memory 114, which is controlled by the horizontal line translucent image processing device 113, stores therein the translucency values of one line before the translucency computing. The input-use translucency line memory 114 is an example of the "input information storage unit". The input-use translucency line memory 114 stores therein the translucency values of the multiple pixels corresponding to the horizontal line parameter (in this case, the multiple pixels included in one line corresponding to the horizontal line parameter) read from the translucent image storage unit 42.

The output-use translucency line memory 115, which is controlled by the horizontal line translucent image processing device 113, stores therein the translucency values of one line after the translucency computing. The output-use translucency line memory 115, which is an example of the "output information storage unit", stores therein the translucency values after the translucency computing of the multiple pixels corresponding to the horizontal line parameter. The horizontal line translucent image processing device 113 writes the translucency value, which is stored in the output-use translucency line memory 115, of each of the pixels corresponding to the horizontal line parameter into the translucent image storage unit 42 as the translucency value of the pixel. The details will be described later.

The memory control I/F 116 functions as an interface with the memory control unit 12. The memory control I/F 116 transmits a memory request to request reading of data and a memory address to the memory control unit 12, for example. As a result, various types of data can be read from the image memory 20. The memory acknowledgement is a response from the memory control unit 12 to the memory request.

An overall controller 117 totally controls the whole operation of the drawing processing unit 11.

Figure 13:
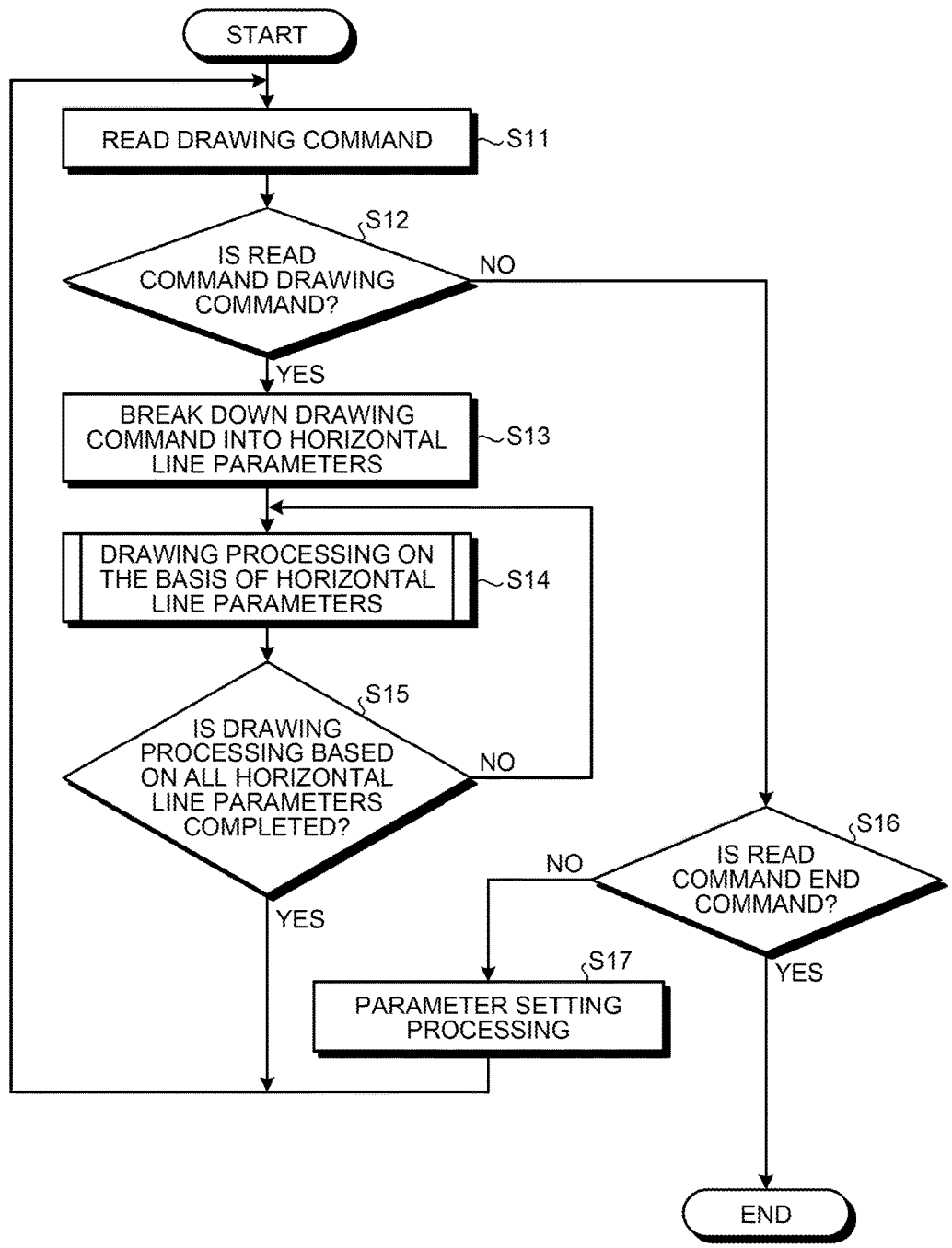
FIG. 13 is a flowchart illustrating an example of the processing performed by the drawing processing unit.

FIG. 13 is a flowchart illustrating an example of the processing performed by the drawing processing unit 11. As illustrated in FIG. 13, the drawing processing unit 11 performs reading processing of the drawing command (step S11). If the read command is the drawing command (Yes at step S12), the drawing processing unit 11 breaks down the drawing command into the horizontal line parameters (step S13). The drawing processing unit 11 performs the drawing processing based on the horizontal line parameters (step S14). If the drawing processing based on all of the horizontal line parameters is completed (Yes at step S15), the drawing processing unit 11 repeats the processing from step S11 onwards. If the horizontal line parameter not yet used for the drawing processing remains (No at step S15), the drawing processing unit 11 repeats the processing from step S14 onwards.

If the command read at step S11 is not the drawing command (No at step S12), the drawing processing unit 11 checks whether the read command is the end command (step S16). If the read command is the end command (Yes at step S16), the processing ends. If the read command is not the end command but the parameter setting command (No at step S16), the drawing processing unit 11 performs the parameter setting processing (step S17) to repeat the processing from step S11 onwards.

Figure 14:
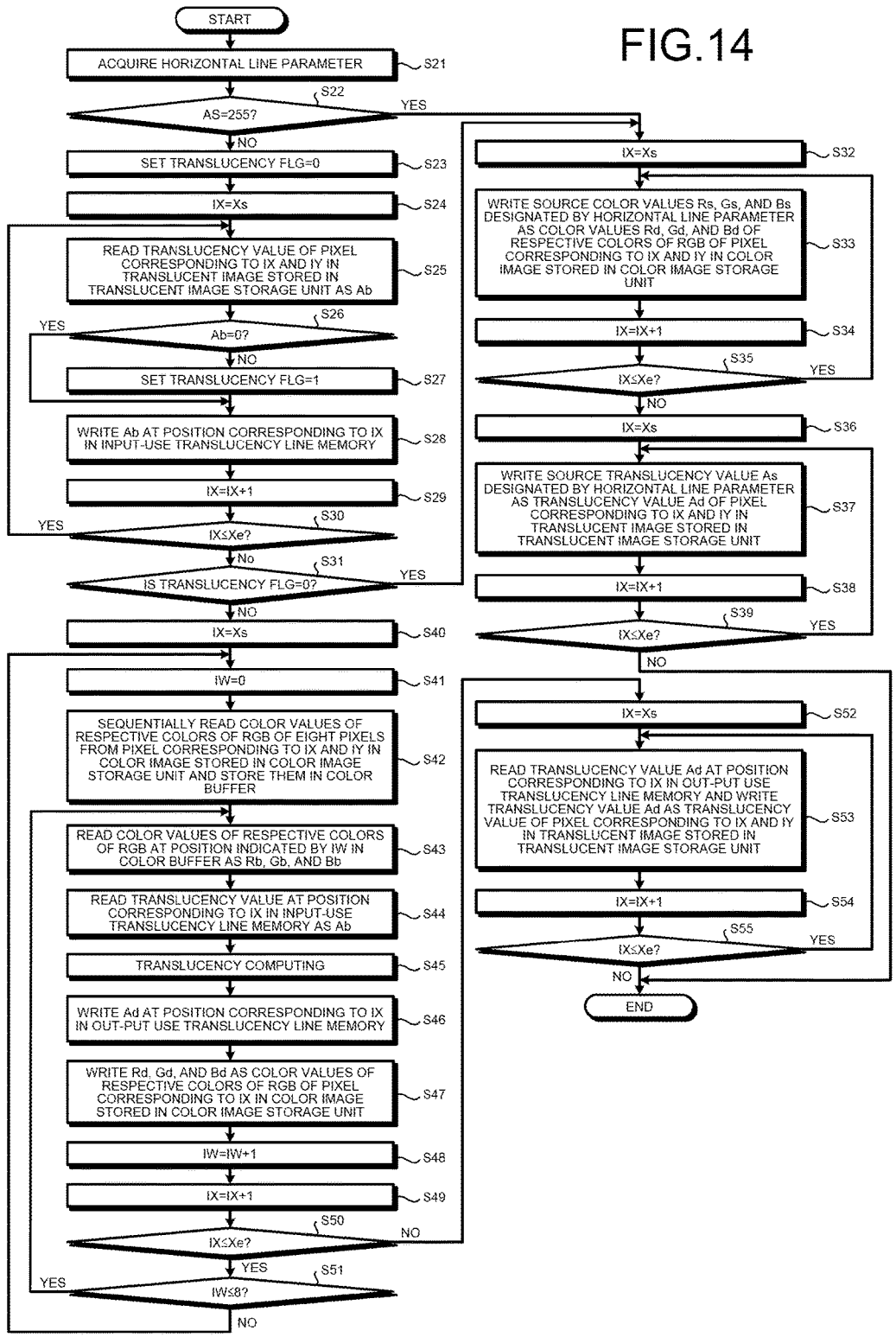
FIG. 14 is a flowchart illustrating a specific content of the drawing processing performed by the drawing processing unit.

FIG. 14 is a flowchart illustrating a specific content of the drawing processing performed by the drawing processing unit 11 at step S14 in the flowchart illustrated in FIG. 13. First, the horizontal line translucent image processing device 113 acquires the horizontal line parameter from the horizontal line parameter generation device 112 (step S21). The horizontal line translucent image processing device 113 checks whether the source translucency value As designated by the horizontal line parameter is a value that indicates opaque (in this example, the value is "255") (step S22). If the result at step S22 is positive (Yes at step S22), the processing proceeds to step S32, which is described later. If the result at step S22 is negative (No at step S22), the horizontal line translucent image processing device 113 sets a translucency flag (FLG) to "zero" (step S23). The horizontal line translucent image processing device 113 sets IX, which is the X coordinate of the pixel serving as the processing object, to the start point coordinate Xs, which is designated by the horizontal line parameter, in the horizontal direction (step S24). The Y coordinate of the pixel serving as the processing object is set to the coordinate IY, which is designated by the horizontal line parameter, in the height direction.

The horizontal line translucent image processing device 113 reads, as Ab (destination translucency value Ab), a translucency value of the pixel corresponding to IX and IY (pixel at the position indicated by coordinates (IX,IY)) in the translucent image stored in the translucent image storage unit 42 (step S25). The horizontal line translucent image processing device 113 checks whether the translucency value Ab read at step S25 is a value that indicates transparent (in this example, the value is "zero") (step S26). If the result at step S26 is negative (No at step S26), the horizontal line translucent image processing device 113 sets the translucency FLG to "one" (step S27). Then, the processing proceeds to step S28. If the result at step S26 is positive (Yes at step S26), the processing proceeds to step S28.

The horizontal line translucent image processing device 113 writes the translucency value Ab at the position corresponding to IX in the input-use translucency line memory 114 (step S28) and increments the X coordinate IX of the pixel serving as the processing object by one pixel (IX=IX+1) (step S29). The horizontal line translucent image processing device 113 checks whether IX is equal to or smaller than the end point coordinate Xe, which is designated by the horizontal line parameter, in the horizontal direction (step S30). If the result at step S30 is positive (Yes at step S30), the horizontal line translucent image processing device 113 repeats the processing from step S25 onwards. If the result at step S30 is negative (No at step S30), the processing proceeds to step S31.

At step S31, the horizontal line translucent image processing device 113 checks whether the translucency FLG is set to "zero" (step S31). That is, the horizontal line translucent image processing device 113 checks whether all of the translucency values of the pixels included in the line corresponding to the horizontal line parameter are values indicating transparent (in this example, the value is "zero"). The following describes the processing in one case where the determination result at step S31 is positive and the other case where the determination result at step S31 is negative.

The case is described where the determination result at step S31 is positive (Yes at step S31). In this case, the horizontal line translucent image processing device 113 sets IX, which is the X coordinate of the pixel serving as the processing object, to the start point coordinate Xs, which is designated by the horizontal line parameter, in the horizontal direction (step S32). The horizontal line translucent image processing device 113 writes the source color values Rs, Gs, and Bs designated by the horizontal line parameter as the color values Rd, Gd, and Bd (destination color values after drawing) of the respective colors of RGB of the pixel corresponding to IX and IY in the color image stored in the color image storage unit 41 (step S33). The horizontal line translucent image processing device 113 increments the X coordinate IX of the pixel serving as the processing object by one pixel (step S34). The horizontal line translucent image processing device 113 checks whether IX is equal to or smaller than the end point coordinate Xe, which is designated by the horizontal line parameter, in the horizontal direction (step S35). If the result at step S35 is positive (Yes at step S35), the horizontal line translucent image processing device 113 repeats the processing from step S33 onwards. If the result at step S35 is negative (No at step S35), the horizontal line translucent image processing device 113 sets IX, which is the X coordinate of the pixel serving as the processing object, to the start point coordinate Xs, which is designated by the horizontal line parameter, in the horizontal direction (step S36).

After step S35, the horizontal line translucent image processing device 113 writes the source translucency value As designated by the horizontal line parameter as the translucency value Ad (destination translucency value after drawing) of the pixel corresponding to IX and IY in the translucent image stored in the translucent image storage unit 42 (step S37). The horizontal line translucent image processing device 113 increments the X coordinate IX of the pixel serving as the processing object by one pixel (step S38). The horizontal line translucent image processing device 113 checks whether IX is equal to or smaller than the end point coordinate Xe, which is designated by the horizontal line parameter, in the horizontal direction (step S39). If the result at step S39 is positive (Yes at step S39), the horizontal line translucent image processing device 113 repeats the processing from step S37 onwards. If the result at step S39 is negative (No at step S39), the processing ends.

The case is described where the determination result at step S31 is negative (No at step S31). In this case, the horizontal line translucent image processing device 113 sets IX, which is the X coordinate of the pixel serving as the processing object, to the start point coordinate Xs, which is designated by the horizontal line parameter, in the horizontal direction (step S40). The horizontal line translucent image processing device 113 sets a value of IW that indicates a read position of the color values of the pixel to "zero" that indicates the read position of the head color values in the color values of eight pixels in a color buffer that stores therein the color values of the respective colors of RGB of eight pixels (step S41). In this example, the color buffer is provided in the drawing processing unit 11.

The horizontal line translucent image processing device 113 sequentially reads the color values of the respective colors of RGB of eight pixels from the pixel corresponding to IX and IY in the color image stored in the color image storage unit 41 to store them in the color buffer (step S42). In this example, data of one pixel in the color image stored in the color image storage unit 41 has 32 bits and data of 32 bits can be read in one burst memory access. One pixel is, thus, one memory word. The maximum burst size in access to an open core protocol (OCP) bus is eight. The color values of eight pixels, thus, can be continuously read. The OCP is a standard of an on-chip bus and does not depend on a specific protocol of a CPU or a bus.

The horizontal line translucent image processing device 113 reads the color values of the respective colors of RGB at the position indicated by IW in the color buffer as Rb, Gb, and Bb (destination color values Rb, Gb, and Bb) (step S43). The horizontal line translucent image processing device 113 reads, as Ab (destination translucency value), the translucency value at the position corresponding to IX in the input-use translucency line memory 114 (step S44).

The horizontal line translucent image processing device 113 performs the translucency computing using the destination color values Rb, Gb, and Bb read at step S43, the destination translucency value Ab read at step S44, and the source color values Rs, Gs, and Bs, and the source translucency value As, which are designated by the horizontal line parameter (step S45). The translucency value (destination translucency value after drawing) Ad after the translucency computing can be obtained by the following expression (1).

$$Ad = (255 - As) \times Ab + As \quad (1)$$

The color values (destination color values after drawing) Rd, Gd, and Bd of the respective colors of RGB after the translucency computing can be obtained by the following expression (2).

$$Rd = ((255 - As) \times Ad \times Rb + As \times Rs)/Ad$$

$$Gd = ((255 - As) \times Ad \times Gb + As \times Gs)/Ad$$

$$Bd = ((255 - As) \times Ad \times Bb + As \times Bs)/Ad \quad (2)$$

The horizontal line translucent image processing device 113 writes Ad (translucency value Ad after the translucency computing) at the position corresponding to IX in the output-use translucency line memory 115 (step S46). The horizontal line translucent image processing device 113 writes Rd, Gd, and Bd (color values Rd, Gd, and Bd after the translucency computing) as the color values of the respective colors of RGB of the pixel corresponding to IX in the color image stored in the color image storage unit 41 (step S47). The horizontal line translucent image processing device 113 increments IW by one pixel (IW=IW+1) (step S48) and increments the X coordinate IX of the pixel serving as the processing object by one pixel (step S49).

The horizontal line translucent image processing device 113 checks whether IX is equal to or smaller than the end point coordinate Xe, which is designated by the horizontal line parameter, in the horizontal direction (step S50). If the result at step S50 is positive (Yes at step S50), the horizontal line translucent image processing device 113 checks whether the value of IW is equal to or smaller than eight (step S51). The horizontal line translucent image processing device 113 thus checks whether the read position exceeds the read position of the end color values in the color values of eight pixels stored in the color buffer. If the result at step S51 is positive (Yes at step S51), the horizontal line translucent image processing device 113 repeats the processing from step S43 onwards. If the result at step S51 is negative (No at step S51), the horizontal line translucent image processing device 113 repeats the processing from step S41 onwards.

If the determination result at step S50 is negative (No at step S50), the horizontal line translucent image processing device 113 sets IX, which is the X coordinate of the pixel serving as the processing object, to the start point coordinate Xs, which is designated by the horizontal line parameter, in the horizontal direction (step S52). The horizontal line translucent image processing device 113 reads the translucency value Ad at the position corresponding to IX in the output-use translucency line memory 115 and writes Ad as the translucency value of the pixel corresponding to IX and IY in the translucent image stored in the translucent image storage unit 42 (step S53). The horizontal line translucent image processing device 113 increments the X coordinate IX of the pixel serving as the processing object by one pixel (step S54). The horizontal line translucent image processing device 113 checks whether IX is equal to or smaller than the end point coordinate Xe, which is designated by the horizontal line parameter, in the horizontal direction (step S55). If the result at step S55 is positive (Yes at step S55), the horizontal line translucent image processing device 113 repeats the processing from step S53 onwards. If the result at step S55 is negative (No at step S55), the processing ends.

Figure 15:
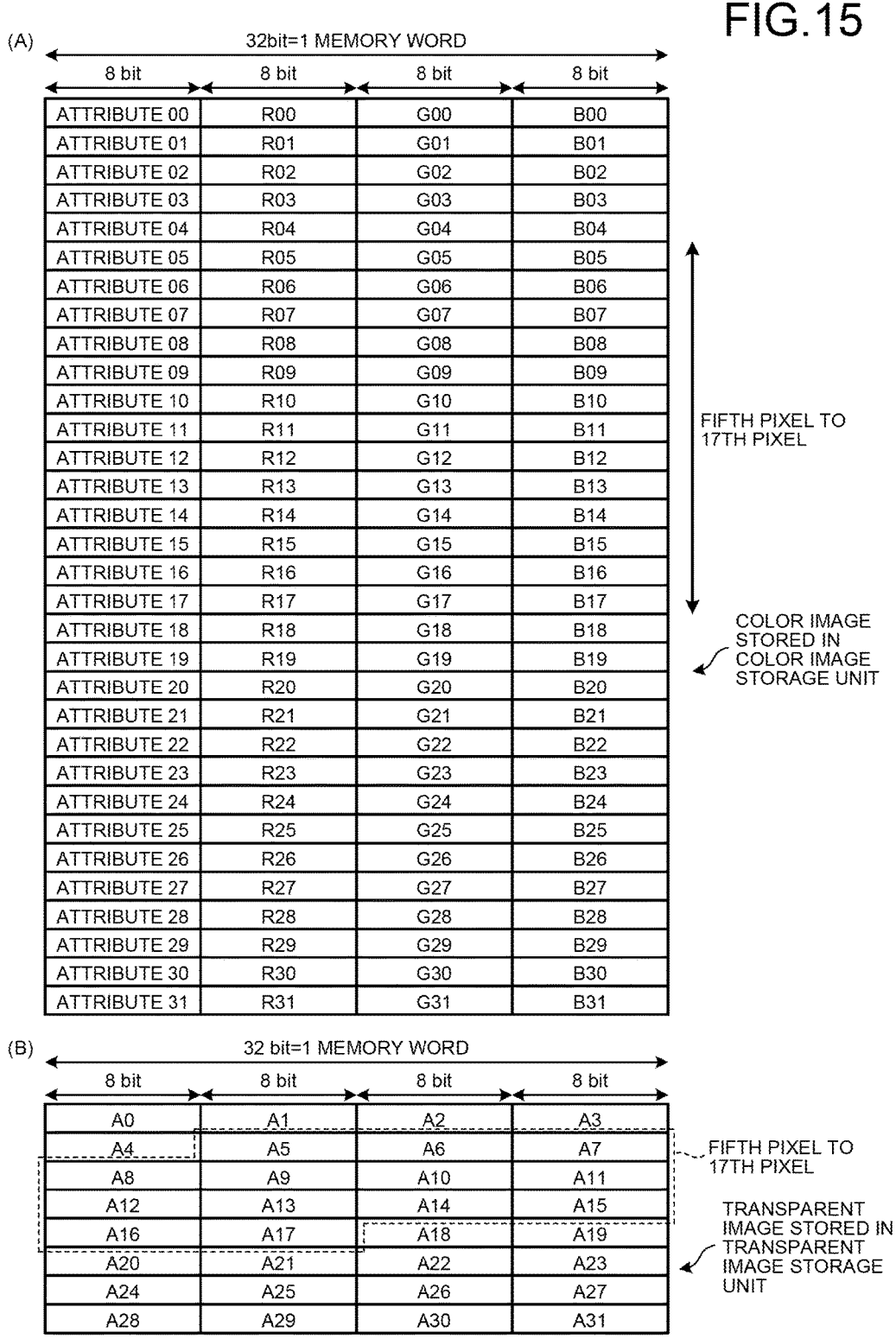
FIG. 15 includes schematic diagrams for explaining a specific example of the drawing processing.

As illustrated in FIG. 15, it is assumed that the 5th pixel to the 17th pixel are drawn as the pixels included in one line corresponding to the horizontal line parameter. As described above, the maximum burst size in access to the OCP bus is eight and data of 32 bits can be read in one burst memory access. As described above, the data of one pixel in the color image stored in the color image storage unit 41 has 32 bits. One pixel is, thus, one memory word. The data of one pixel in the translucent image stored in the translucent image storage unit 42 has 8 bits. The data of one line has 32 bits in which each of the four pixels has a bit depth of 8 bits. The four pixels included in one line of the plane is, thus, one memory word.

Figure 16:
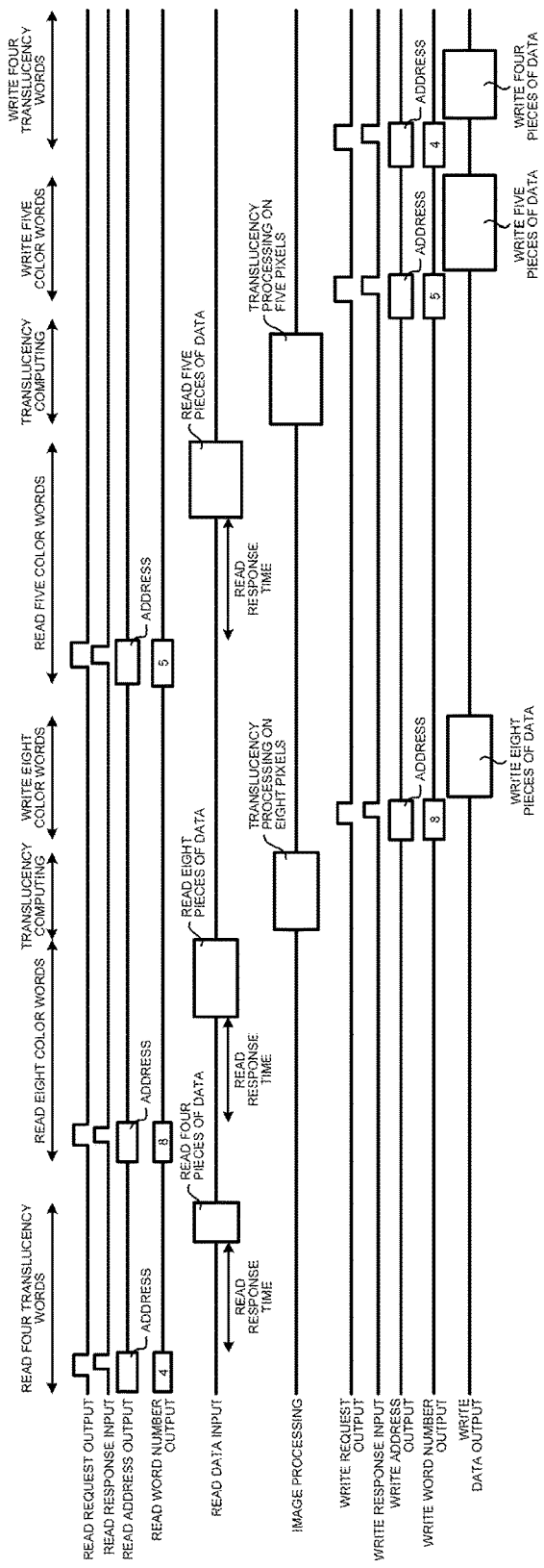
FIG. 16 is a timing chart of the drawing processing in the embodiment.

FIG. 16 is a timing chart of the drawing processing in the embodiment based on the assumption described with reference to FIG. 15. In FIG. 16, the item "read request output" represents timing at which the drawing processing unit 11 outputs a read request. The item "read address output", which is output of the drawing processing unit 11, represents the head address of an object to be read. The item "read word number output", which is output of the drawing processing unit 11, represents the number of words (the number of words of the object to be read) from the head address of the object to be read. The item "read response input", which is output of the memory control unit 12, represents receiving of a read address and the number of read words. The item "read data input", which is output of the memory control unit 12, represents data that is read from the image memory 20 and corresponds to the number of words from the head address received from the drawing processing unit 11.

As illustrated in FIG. 16, the drawing processing unit 11 reads the translucency values of the pixels (from the 5th pixel to the 17th pixel) included in the line corresponding to the horizontal line parameter. In this example, the drawing processing unit 11 reads the data of four lines from the second line to the fifth line (refer to (B) in FIG. 15) in the translucent image stored in the translucent image storage unit 42 (read translucency four words). The drawing processing unit 11, then, reads the data of the pixels from the 5th pixel to the 12th pixel, which corresponds to eight memory words, in the color image stored in the color image storage unit 41 (read color eight words) and performs the translucency computing. The drawing processing unit 11, then, writes the color values after the translucency computing into the color image storage unit 41 (write color eight words). At this time, the drawing processing unit 11 writes the translucency value after the translucency computing into the output-use translucency line memory 115. The drawing processing unit 11, then, reads the data of the pixels from the 13th pixel to the 17th pixel, which corresponds to five memory word, in the color image stored in the color image storage unit 41 (read color five words) and performs the translucency computing. The drawing processing unit 11, then, writes the color values after the translucency computing in the color image storage unit 41 (write color five words). At this time, the drawing processing unit 11 writes the translucency value after the translucency computing in the output-use translucency line memory 115. The drawing processing unit 11 writes the translucency values after the translucency computing of the line stored in the output-use translucency line memory 115 into the translucent image storage unit 42 (write translucency four words).

Figure 17:
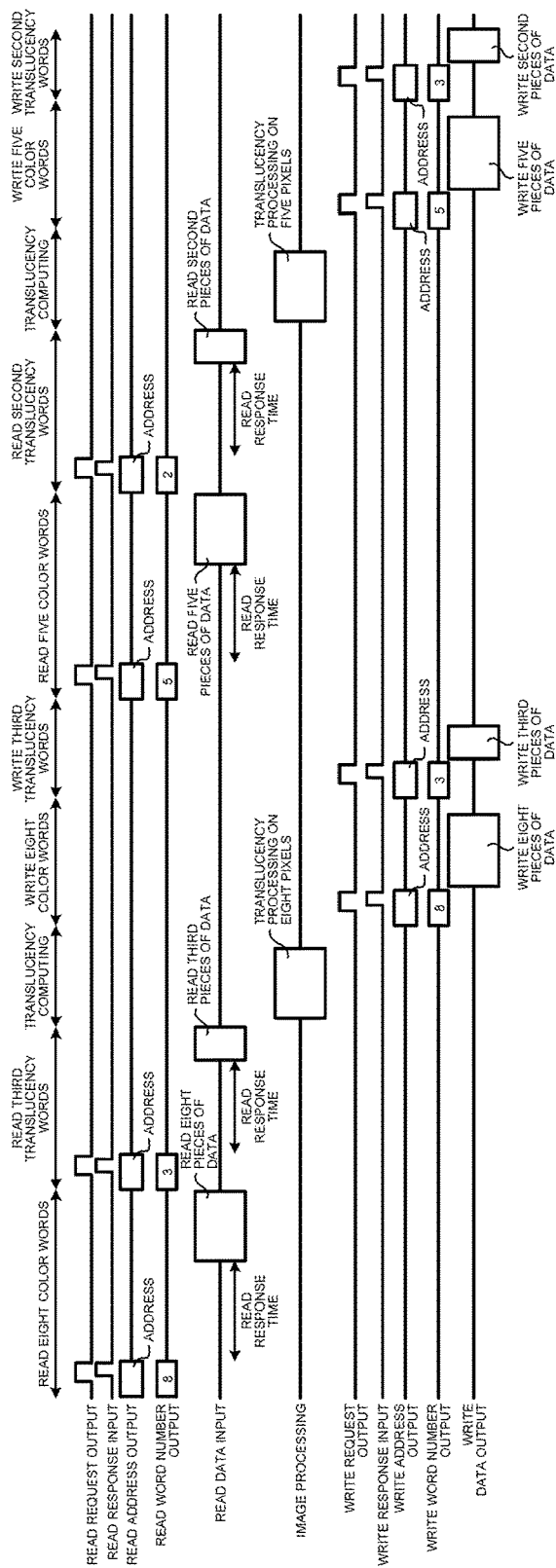
FIG. 17 is a timing chart of the drawing processing of a comparative example.

The following describes a comparative example where the translucency value of the pixel is assumed to be read every time the color values of the pixel are read in eight bursts, which is the maximum burst size. FIG. 17 is a timing chart of the drawing processing in the comparative example. As illustrated in FIG. 17, the drawing processing unit 11 reads the data of the pixels from the 5th pixel to the 12th pixel, which corresponds to eight memory words, in the color image stored in the color image storage unit 41 (read color eight words). The drawing processing unit 11, then, reads the translucency values of the respective corresponding pixels. In this example, the drawing processing unit 11 reads the data of three lines from the second line to the fourth line (refer to (B) in FIG. 15) in the translucent image stored in the translucent image storage unit 42 (read translucency three words). The drawing processing unit 11, then, performs the translucency computing. The drawing processing unit 11 writes the color values after the translucency computing into the color image storage unit 41 (write color eight words) and the translucency values after the translucency computing into the translucent image storage unit 42 (write translucency three words). The drawing processing unit 11, then, reads the data of the pixels from the 13th pixel to the 17th pixel, which corresponds to five memory words, in the color image stored in the color image storage unit 41 (read color five words). The drawing processing unit 11, then, reads the translucency values of the respective corresponding pixels. In this example, the drawing processing unit 11 reads the data of two lines of the fourth line and the fifth line (refer to (B) in FIG. 15) in the translucent image stored in the translucent image storage unit 42 (read translucency two words). The drawing processing unit 11, then, performs the translucency computing. The drawing processing unit 11 writes the color values after the translucency computing into the color image storage unit 41 (write color five words) and the translucency values after the translucency computing into the translucent image storage unit 42 (write translucency two words).

In the comparative example, the color values can be efficiently read eight words by eight words, but the reading of the translucency values is inefficient due to frequent memory access because the memory format of the translucent image storage unit 42 is the plane format and due to the reading and writing required for the same line (in the example described above, the fourth line). The problem of the comparative example is a long drawing time due to frequent occurrence of the read response time, particularly in reading memories.

In contrast, the embodiment reads and writes the translucency values of the pixels included in one line corresponding to the horizontal line parameter without reading and writing the translucency values separately, thereby making it possible to efficiently read and write the translucency values.

As described above, in the embodiment, the translucency values of the multiple pixels corresponding to the horizontal line parameter are concurrently read from the translucent image storage unit 42 in the drawing processing based on the horizontal line parameter obtained by breaking down the drawing command. When all of the read translucency values indicate transparent, the color values designated by the horizontal line parameter are directly written into the color image storage unit 41 as the color values of the respective pixels corresponding to the horizontal line parameter without reading the color values of the pixels corresponding to the horizontal line parameter from the color image storage unit 41. As a result, the embodiment can achieve higher-speed drawing processing than the conventional method.

The programs executed by the image forming apparatus 100 of the embodiment may be recorded and provided in a computer-readable recording medium such as a compact disc ROM (CD-ROM), a flexible disk (FD), a CD-recordable (CD-R), a digital versatile disc (DVD), and a universal serial bus (USB), as an installable or executable file. The programs may be provided or distributed via a network such as the Internet. The various programs may be embedded and provided in a ROM, for example.

The present embodiments can provide the image processing apparatus and the image processing method that can achieve high-speed drawing processing.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

What is claimed is:

1. An image processing apparatus, comprising:
   a memory configured to,
      store a color image including a first color value for each of a plurality of pixels, and
      store, a translucent image including a first translucency value indicating a transmission rate of the first color value corresponding to the pixel for each of the plurality of pixels; and
   a processor configured to,
      break down a drawing command obtained by analyzing data described in a page description language into horizontal line parameters each indicating a drawing parameter on a line-by-line basis, and
      modify the color image in the memory by,
         reading, from the memory, the first translucency values of a plurality of pixels corresponding to the horizontal line parameter,
         determining whether all of the first translucency values indicate that the transmission rate of the plurality of pixels corresponding to the horizontal line parameter is transparent,
         if the processor determines that not all of the first translucency values indicate that the transmission rate of the plurality of pixels corresponding to the horizontal line parameter is transparent,
reading the first color values of the pixels corresponding to the horizontal line parameter from the color image;
for each of the pixels corresponding to the horizontal line parameter, performing translucency computing to obtain a third translucency value based on the first translucency value read from the memory and a second translucency value designated by the horizontal line parameter, and performing translucency computing to obtain a third color value based on the read first translucency value, the third translucency value, the second translucency value designated by the horizontal line parameter, second color values designated by the horizontal line parameter, and the first color values read from the color image; and
writing the third color values after the translucency computing directly into the color image in the memory as the color values of the pixel for each of the pixels corresponding to the horizontal line parameter, and
if the processor determines that all of the first translucency values indicate that the transmission rate of the plurality of pixels corresponding to the horizontal line parameter is transparent,
writing the second color values designated by the horizontal line parameter directly into the color image in the memory as the color values of the respective pixels corresponding to the horizontal line parameter instead of the reading the first color values, the performing the translucency computing, and the writing the third color values.

2. The image processing apparatus according to claim 1, further comprising:
an input information memory configured to store therein the first translucency values of the pixels corresponding to the horizontal line parameter, the first translucency values being read from the memory; and
an output information memory configured to store therein the third translucency values after the translucency computing of the pixels corresponding to the horizontal line parameter, wherein
the processor is further configured to write the third translucency value of each of the pixels corresponding to the horizontal line parameter, the third translucency value in the output information memory, into the translucency image in the memory as the translucency value of the pixel, when the translucency value indicating translucent is included in the first translucency values read from the memory.

3. The image processing apparatus according to claim 1, wherein,
the processor is configured to store the color image in a point-sequential memory format in the memory such that data is arranged pixel by pixel, and
the processor is configured to store the translucent image in a plane-sequential memory format in the memory such that data is arranged line by line of a plane representing a set of pixels arranged in a matrix.

4. The image processing apparatus according to claim 1, wherein the horizontal line parameter includes at least a coordinate of a drawing object in a height direction, a start point coordinate and an end point coordinate of the drawing object in a horizontal direction, the second color values used for drawing the drawing object, and second translucency values used for drawing the drawing object.

5. An image processing method, comprising:
breaking down, by a processor, a drawing command obtained by analyzing data described in a page description language into horizontal line parameters each indicating a drawing parameter on a line-by-line basis; and
modifying, by the processor, a color image in a memory by,
reading first translucency values of pixels corresponding to the horizontal line parameter, from the memory configured to store a translucent image including a first translucency value indicating a transmission rate of a first color value corresponding to a pixel for each of a plurality of pixels and the color image, the color image including the first color values for each of the plurality of pixels,
determining whether all of the first translucency values indicate that the transmission rate of the plurality of pixels corresponding to the horizontal line parameter is transparent,
if the processor determines that not all of the first translucency values indicate that the transmission rate of the plurality of pixels corresponding to the horizontal line parameter is transparent,
reading the first color values of the pixels corresponding to the horizontal line parameter from the color image;
for each of the pixels corresponding to the horizontal line parameter, performing translucency computing to obtain a third translucency value based on the first translucency value read from the memory and a second translucency value designated by the horizontal line parameter, and performing translucency computing to obtain a third color value based on the read first translucency value, the third translucency value, the second translucency value designated by the horizontal line parameter, second color values designated by the horizontal line parameter, and the first color values read from the color image; and
writing the third color values after the translucency computing directly into the color image in the memory as the color values of the pixel for each of the pixels corresponding to the horizontal line parameter, and
if the processor determines that all of the first translucency values indicate that the transmission rate of the plurality of pixels corresponding to the horizontal line parameter is transparent,
writing the second color values designated by the horizontal line parameter directly into the color image in the memory for each of a plurality of pixels as the color values of the respective pixels corresponding to the horizontal line parameter instead of the reading the first color values, the performing the translucency computing, and the writing the third color values.

6. An image processing apparatus, comprising:
color image storage means for storing a color image including a first color value for each of a plurality of pixels;
translucent image storage means for storing a translucent image including a first translucency value indicating a transmission rate of the first color value corresponding to the pixel for each of the plurality of pixels;

breakdown means for breaking down a drawing command obtained by analyzing data described in a page description language into horizontal line parameters each indicating a drawing parameter on a line-by-line basis; and drawing processing means for modifying the color image stored in the color image storage means by,
reading, from the translucent image storage means, the first translucency values of a plurality of pixels corresponding to the horizontal line parameter,
determining whether all of the first translucency values indicate that the transmission rate of the plurality of pixels corresponding to the horizontal line parameter is transparent,
if the drawing processing means determines that not all of the first translucency values indicate that the transmission rate of the plurality of pixels corresponding to the horizontal line parameter is transparent,
reading the first color values of the pixels corresponding to the horizontal line parameter from the color image;
for each of the pixels corresponding to the horizontal line parameter, performing translucency computing to obtain a third translucency value based on the first translucency value read from the translucent image storage means and a second translucency value designated by the horizontal line parameter, and performing translucency computing to obtain a third color value based on the read first translucency value, the third translucency value, the second translucency value designated by the horizontal line parameter, second color values designated by the horizontal line parameter, and the first color values read from the color image; and
writing the third color values after the translucency computing directly into the color image in the translucent image storage means as the color values of the pixel for each of the pixels corresponding to the horizontal line parameter, and
if the drawing processing means determines that all of the first translucency values indicate that the transmission rate of the plurality of pixels corresponding to the horizontal line parameter is transparent,
writing second color values designated by the horizontal line parameter directly into the color image storage means as the color values of the respective pixels corresponding to the horizontal line parameter instead of the reading the first color values, the performing the translucency computing, and the writing the third color values.

7. An image processing apparatus, comprising:
a memory configured to,
store a color image including a first color value for each of a plurality of pixels, and
store, a translucent image including a first translucency value indicating a transmission rate of the first color value corresponding to the pixel for each of the plurality of pixels; and a processor configured to,
break down a drawing command obtained by analyzing data described in a page description language into horizontal line parameters each indicating a drawing parameter on a line-by-line basis, and
modify the color image in the memory by,
reading, from the memory, the first translucency values of a plurality of pixels corresponding to the horizontal line parameter,
determining whether all of the first translucency values indicate that the transmission rate of the plurality of pixels corresponding to the horizontal line parameter is transparent,
writing second color values designated by the horizontal line parameter directly into the color image in the memory as the color values of the respective pixels corresponding to the horizontal line parameter without reading the first color values of the pixels corresponding to the horizontal line parameter from the color image, if the processor determines that all of the first translucency values indicate that the transmission rate of the plurality of pixels corresponding to the horizontal line parameter is transparent, and
controlling printing of an output image based on the modified color image.

8. The image processing apparatus according to claim 7, wherein
when a translucency value indicating translucent is included in the first translucency values read from the memory, the processor is further configured to modify the color image in the memory by,
reading the first color values of the pixels corresponding to the horizontal line parameter from the color image,
for each of the pixels corresponding to the horizontal line parameter, performing translucency computing to obtain a third translucency value based on the first translucency value read from the memory and a second translucency value designated by the horizontal line parameter and performing translucency computing to obtain a third color value based on the read first translucency value, the third translucency value, the second translucency value designated by the horizontal line parameter, the second color value designated by the horizontal line parameter, and the first color values read from the color image, and
writing the third color values after the translucency computing directly into the color image in the memory as the color values of the pixel for each of the pixels corresponding to the horizontal line parameter.

9. The image processing apparatus according to claim 7, wherein the horizontal line parameter includes at least a coordinate of a drawing object in a height direction, a start point coordinate and an end point coordinate of the drawing object in a horizontal direction, the second color values used for drawing the drawing object, and second translucency values used for drawing the drawing object.

* * * * *